US007240250B2

(12) United States Patent
Lea et al.

(10) Patent No.: US 7,240,250 B2
(45) Date of Patent: Jul. 3, 2007

(54) HEAD DEGRADATION CHARACTERIZATION FOR A DATA STORAGE DEVICE

(75) Inventors: Shau Yann Lea, Singapor (SG);
Jeremy Garci Olanda, Singapor (SG);
Yeong Heng Tan, Singapore (SG);
Barish Chakravarty, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 550 days.

(21) Appl. No.: 10/458,633

(22) Filed: Jun. 10, 2003

(65) Prior Publication Data

US 2004/0044939 A1   Mar. 4, 2004

Related U.S. Application Data

(60) Provisional application No. 60/406,903, filed on Aug. 29, 2002.

(51) Int. Cl.
*G06F 11/00* (2006.01)
(52) U.S. Cl. ...................................... 714/704; 714/708
(58) Field of Classification Search ................. 714/704
See application file for complete search history.

(56) References Cited

U.S. PATENT DOCUMENTS

| 3,568,174 A * | 3/1971 | Jacoby et al. .................. 360/40 |
| 3,796,866 A * | 3/1974 | McClellan .................... 377/53 |
| 4,197,564 A * | 4/1980 | Ravizza .................... 360/77.17 |
| 4,502,021 A * | 2/1985 | Hill et al. .................... 330/279 |
| 4,613,915 A * | 9/1986 | Crouse et al. ........... 360/77.02 |
| 4,953,041 A * | 8/1990 | Huber ......................... 360/46 |
| 5,101,309 A * | 3/1992 | Mitsuhashi ................... 360/68 |
| 5,325,242 A * | 6/1994 | Fukuchi et al. ............... 360/46 |
| 5,357,496 A * | 10/1994 | Ikeda et al. .............. 369/44.29 |
| 5,483,552 A * | 1/1996 | Shimazaki et al. ......... 375/233 |
| 5,677,801 A * | 10/1997 | Fukuchi et al. ............... 360/46 |
| 5,966,258 A | 10/1999 | Bliss |
| 6,018,554 A * | 1/2000 | Glover ........................ 375/345 |
| 6,046,878 A * | 4/2000 | Liu et al. ...................... 360/75 |
| 6,151,178 A * | 11/2000 | Glover ........................ 360/46 |
| 6,249,890 B1 * | 6/2001 | Ukani et al. ................ 714/721 |
| 6,268,972 B1 | 7/2001 | Philpott et al. |
| 6,337,777 B1 | 1/2002 | Matsubara et al. |
| 6,413,325 B1 | 7/2002 | Shimazawa et al. |
| 6,618,215 B2 * | 9/2003 | Fung et al. ................... 360/31 |

* cited by examiner

*Primary Examiner*—Joseph D. Torres
(74) *Attorney, Agent, or Firm*—Fellers, Snider, et al.

(57) ABSTRACT

A method and apparatus for characterizing whether a head of a data storage device exhibits excessive performance degradation. The device includes a data transducing head adjacent a recording medium, and read channel circuitry with a variable gain amplifier (VGA) and gain control block. The gain control block supplies VGA gain control values to the VGA to nominally maintain amplitudes of readback signals obtained from the head within a selected range suitable for remaining portions of the read channel circuitry. A baseline VGA gain control value is first obtained, after which the read channel is parametrically adapted to optimize read error performance. An adaptive VGA gain control value is thereafter obtained, and head degradation is determined in relation to the magnitude of the adaptive VGA gain control value as well as in relation to a difference between the VGA gain control value and the baseline value.

9 Claims, 3 Drawing Sheets

HEAD DEGRADATION CHARACTERIZATION FOR A DATA STORAGE DEVICE

RELATED APPLICATIONS

This application claims priority to U.S. Provisional Application No. 60/406,903 filed Aug. 29, 2002, entitled VGA SCREEN TEST FOR HARD DRIVE OPERATION.

FIELD OF THE INVENTION

This invention relates generally to the field of magnetic data storage devices, and more particularly, but not by way of limitation, to identifying degradation of a head of a data storage device based on a change in gain applied to a read signal by a variable gain amplifier.

BACKGROUND

Data storage devices are used for data storage in modern electronic products ranging from digital cameras to network systems. A data storage device includes a mechanical portion, or head disc assembly, and electronics, or printed circuit board assembly, mounted to the head disc assembly. The printed circuit board assembly controls functions of the head disc assembly while providing a communication interface between the data storage device and its host.

The head disc assembly has a disc rotated at a constant speed by a spindle motor assembly and a position controllable actuator assembly, which supports a data transducing head that selectively writes data to and reads data from the disc.

The data storage device market continues to place pressure on the industry for data storage devices with improved reliability. Degradation in read/write head performance at customer sites continues to pose a reliability issue for customers.

As such, challenges remain and a need persists for improvements in detection of read/write heads prone to performance degradation.

SUMMARY OF THE INVENTION

In accordance with preferred embodiments, a method and apparatus are provided for characterizing whether a head of a data storage device exhibits excessive performance degradation.

The method preferably includes determining a baseline variable gain amplifier (VGA) gain control value for the head, the baseline VGA gain control value operatively normalizing an amplitude of a readback signal from the head to a selected range suitable for decoding by read channel circuitry. The read channel circuitry is next parametrically adapted to optimize read error performance, and an adaptive VGA gain control value for the head is obtained.

The head is thereafter characterized as exhibiting excessive degradation when the adaptive VGA gain control value exceeds a predetermined VGA value threshold, else when a difference between the adaptive VGA gain control value and the baseline VGA gain control value exceeds a predetermined delta VGA value threshold.

Preferably, the head is removed and replaced with a second head when the original head is found to exhibit excessive degradation. Contrawise, the head is adjudged as a good head (i.e., exhibiting non-degradation) when the magnitude of the VGA gain control value, and the difference, do not exceed the respective thresholds. The method is preferably carried out in a manufacturing environment prior to shipment of the device to a customer.

The apparatus preferably comprises a data storage device having a data transducing head adjacent a recording medium. Read channel circuitry is coupled to the head and comprises a variable gain amplifier and a gain control block. The gain control block operably supplies VGA gain control values to the VGA to nominally maintain amplitudes of readback signals obtained from the head within a selected range suitable for remaining portions of the read channel circuitry.

A controller coupled to the read channel circuitry operates to determine a baseline VGA gain control value, perform a parametric adaptation of the read channel circuitry, and then obtain an adaptive VGA gain control value. The controller further operates to characterize the head as exhibiting excessive degradation in relation to a magnitude of the adaptive VGA gain control value and in relation to a difference between the adaptive VGA gain control value and the baseline VGA gain control value.

Preferably, the device operates in conjunction with a monitoring system and the results of the characterization operation are displayed on a monitor. As before, the characterization preferably occurs during device manufacturing, enabling the device manufacturer to remove and replace degraded heads prior to shipment of the device to the customer.

These and various other features and advantages that characterize the claimed invention will be apparent upon reading the following detailed description and upon review of the associated drawings.

DETAILED DESCRIPTION

Figure 1:
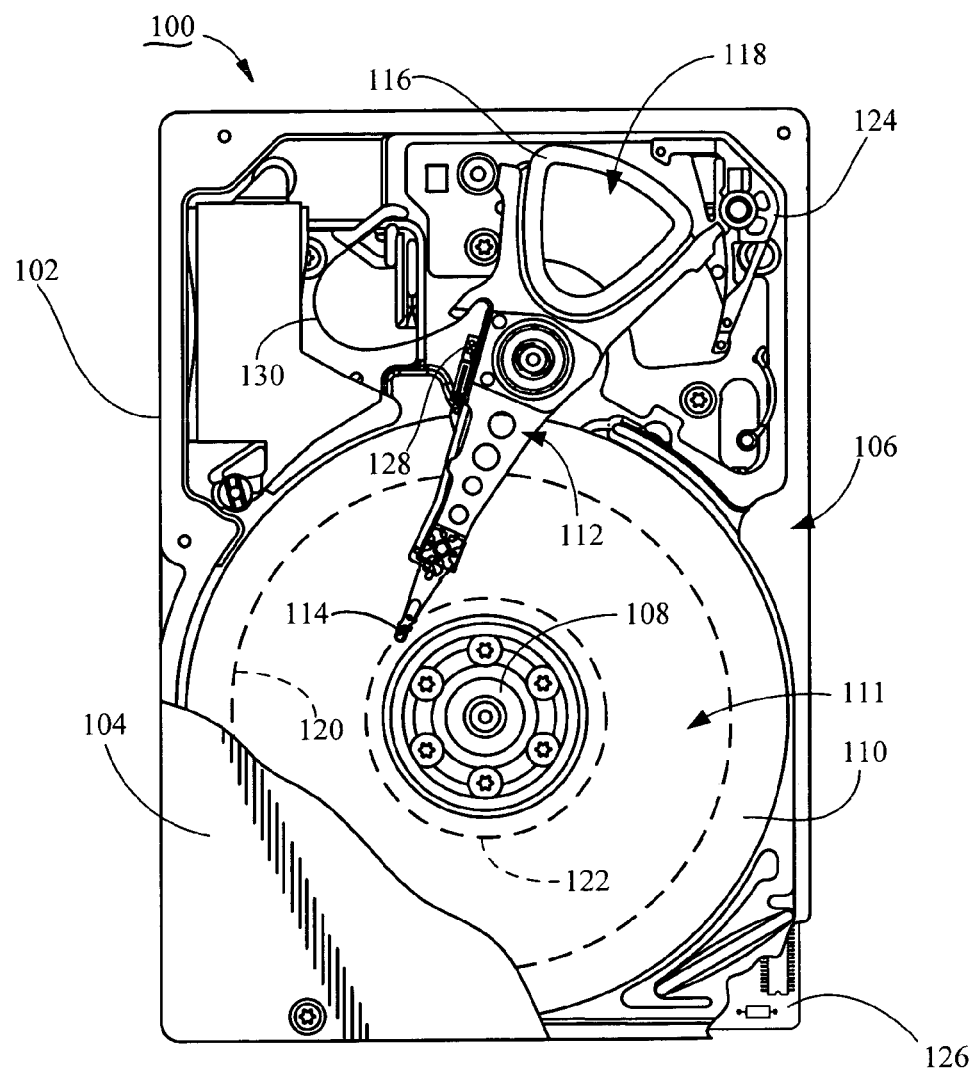
FIG. 1 is a top plan view of a data storage device constructed and operated in accordance with preferred embodiments of the present invention to identify heads exhibiting excessive head degradation.

Referring now to the drawings, FIG. 1 provides a top plan view of a data storage device 100. The data storage device 100 includes a rigid base deck 102, which cooperates with a top cover 104 (shown in partial cutaway) to form a sealed housing for a mechanical portion of the data storage device 100 (also referred to as disc drive 100). Typically, the mechanical portion of the data storage device 100 is referred to as a head-disc assembly 106.

A spindle motor 108 rotates a number of magnetic data storage discs 110 at a constant high speed, each disc 110 having at least one recording surface 111. A rotary actuator 112 supports a number of data transducing heads 114 adjacent the discs 110. The actuator 112 is rotated through application of current to a coil 116 of a voice coil motor (VCM) 118.

During data transfer operations with a host device (not shown), the actuator 112 moves the heads 114 to data tracks 120, one shown (also referred to as an information track) on the surfaces of the discs 110 to write data to and read data from the discs 110. When the data storage device 100 is deactivated, the actuator 112 removes the heads 114 from the data tracks 120 to a home position 122 of the disc 110; the actuator 112 is then confined by latching a toggle latch 124.

Command and control electronics, as well as other interface and control circuitry for the data storage device 100, are provided on a printed circuit board assembly 126 mounted to the underside of the base deck 102. A preamplifier/driver circuit (preamp) 128 conditions read/write signals passed between the command and control electronics of the printed circuit board assembly 126 and the head 114. The preamp 128 is attached to a flex circuit 130, which conducts signals between the printed circuit board assembly 126 and the head 114 during data transfer operations.

Figure 2:
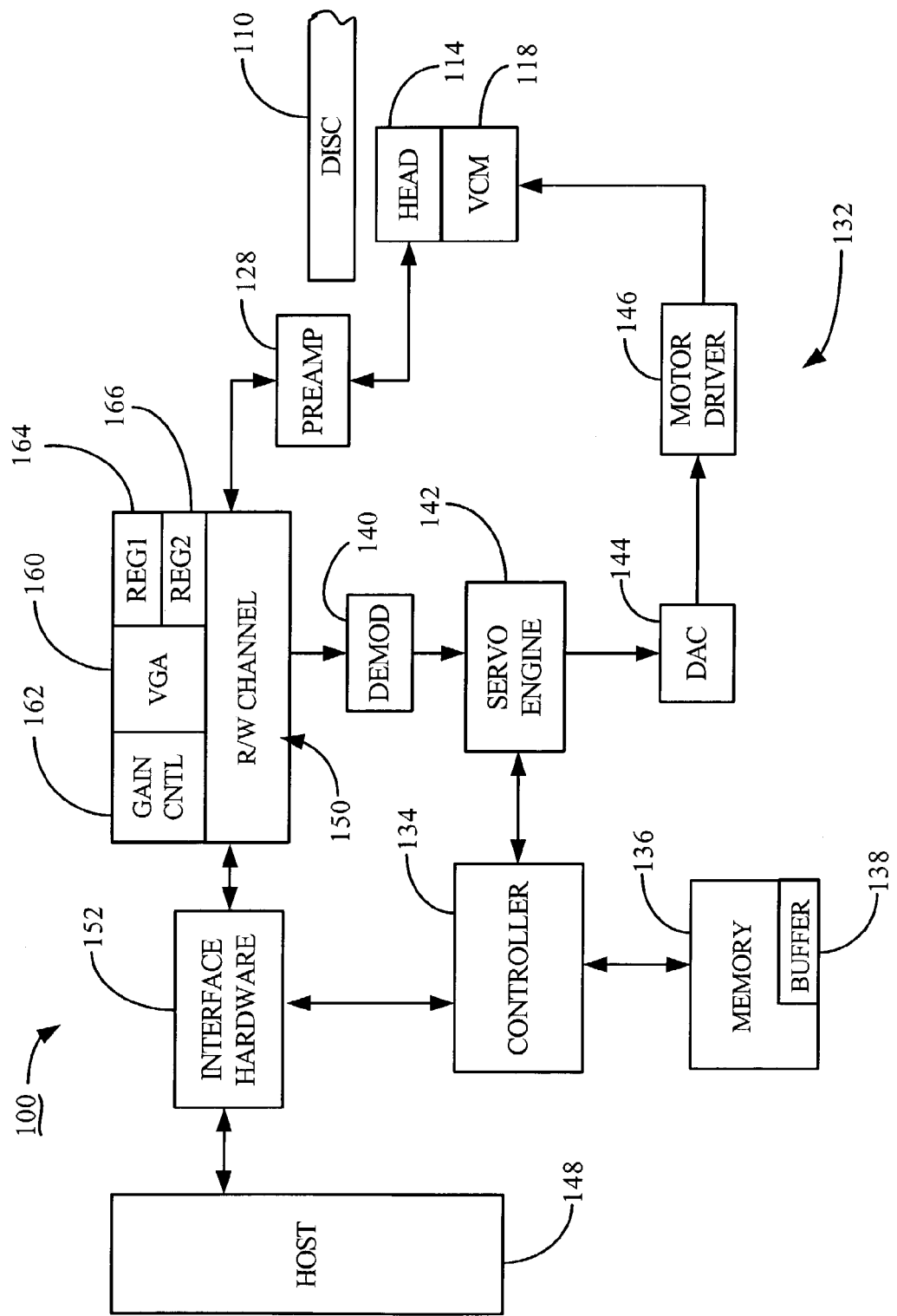
FIG. 2 is a functional block diagram of the device of FIG. 1 in conjunction with a host computer.

Turning to FIG. 2, shown therein is a functional block diagram of the device 100. Position-controlling of the head 114 is provided by the VCM 118 (FIG. 1) operating under the control of a closed-loop servo control circuit 132 programmed with servo control code.

The servo control circuit 132 generally includes a microprocessor controller 134, associated memory 136 with buffer 138, a demodulator (DEMOD) circuit 140, a servo engine 142, a digital to analog converter (DAC) 144 and a motor driver circuit 146. Preferably, the controller 134, the memory 136, and the servo engine 142 are incorporated into an application specific integrated circuit (ASIC). The buffer 138 is used to store information collected or calculated during operation of the data storage device 100.

The demodulator 140 conditions head position control information transduced from the information track 120 of the disc 110 to provide position information of the head 114 relative to the disc 110. The servo engine 142 generates servo control loop values used by the controller 134 in generating command signals such as seek signals used by the voice coil motor 118 in executing seek commands. Control loop values are also used to maintain a predetermined position of the actuator 112 during data transfer operations.

The command signals generated by the controller 134 and passed by the servo engine 142 are converted by the DAC 144 to analog control signals. The analog control signals are used by the motor driver circuit 146 to control application of current to the coil 116.

Device control code is preferably provided to control data transfer functions between a host computer 148 and the data storage device 100. Data received from the host 148 to be stored to the discs 110 are placed in the memory 136 for transfer to the disc 110 by write channel circuitry of a read/write (R/W) channel 150, which operates under control of the controller 134 and interface hardware 152. Read data requested by the host 148 are read by the head 114 from the associated track 120, decoded by read channel circuitry of the R/W channel 150 and temporarily placed in the memory 136 awaiting subsequent transfer to the host.

The device control code further preferably includes idle interface activated commands such as seek to improve reliability (STIR) control code. The STIR control code initiates a seek sequence during periods of inactivity of the data storage device 100 to carry out a number of operational enhancement functions such as clearing accumulated debris from the heads 114 and surfaces 111, dithering to periodically move different heads to different tracks to minimize localized wear patterns, and so on.

The device control code also preferably includes factory command code used for testing and certifying the data storage device 100 during the production process. The factory command code provides access to regions of the disc 110 unavailable to the customer, allows suspension of interface commands resident in the device control code and provides an ability to structure command sequences normally unavailable to customers.

Of particular interest to the present discussion is a novel aspect of the factory code presented herein, which facilitates execution of a head degradation characterization operation. As explained below, this operation serves to characterize whether or not a particular head 114 is likely to degrade and become inoperable over the life of the data storage device 100, allowing such head to be removed and replaced prior to shipment of the device 100 to the customer.

Before discussing preferred implementations of such code, it will be helpful to briefly review further aspects of the R/W channel 150 of FIG. 2. During a read operation, the head 114 provides a readback signal to the preamp 128 that, upon amplification of the readback signal, provides an input signal to the R/W channel 150. The input signal is provided to an automatic gain control (AGC) stage comprising a variable gain amplifier (VGA) 160 and a gain control block 162.

Generally, the AGC stage is used to normalize the gain (peak to peak amplitude) of the input signal during read operations to a nominal range suitable for subsequent sampling and decoding by the R/W channel 150. More particularly, the gain control block 162 evaluates and, as needed, adjusts the magnitude of a variable gain control value (herein "VGA value") supplied to the VGA 160. In turn, the VGA 160 operates upon the amplified readback signal to provide a substantially constant amplitude output signal to facilitate decoding of information contained in the readback signal.

In a preferred embodiment, upon initialization of the data storage device 100, the R/W channel 150 performs a self-gain adaptation of an input signal to determine an initial VGA value, which is placed in a first register 164. This is preferably carried out using a selected head 114 to read a prewritten data pattern on a selected track. An initial VGA value is provided to the VGA 160, and a series of readback signals are provided to the VGA. The initial VGA gain value is thereafter converged to the final, baseline VGA value in relation to the detected peak-to-peak amplitudes of the series of readback signals.

If the head 114 is unable to sufficiently stay on track during the reading of the prewritten data pattern (due to servo errors or other conditions), the head 114 is repositioned over an alternate information track 120 and the process is repeated until an optimized VGA value is found.

The self-gain adaptation procedure is repeated for each head 114 present in the data storage device 100 with the resulting baseline VGA values for each head stored in the buffer memory 138.

Table 1 provides an illustrative example of representative baseline VGA values obtained for a device (such as 100) having a total of four discs 108 and eight heads 114 (numerically denoted as heads 0-7). The baseline VGA values are unitless gain values. The particular ranges and magnitudes of VGA values will depend upon the configuration of a particular device.

TABLE 1

| HEAD | BASELINE VGA VALUE |
| --- | --- |
| 0 | 109 |
| 1 | 117 |
| 2 | 089 |
| 3 | 109 |
| 4 | 096 |
| 5 | 075 |
| 6 | 097 |
| 7 | 104 |

Preferably, the baseline VGA values are obtained during initial stages of manufacturing test operations performed upon the assembled device 100. The predetermined test patterns are preferably oscillatory (such as 2T) patterns written to guard tracks not normally accessed during operation, although other approaches can readily be used.

Conventional factory test routines are thereafter preferably performed upon the device 100 to calibrate and certify various aspects of the device. During this process the R/W channel 150 will be sufficiently configured to self adjust during operation to achieve minimum readback errors.

When the device 100 is so configured, the head characterization process continues with the determination of so-called adaptive VGA values for each head. As explained in detail below, the adaptive VGA values preferably comprise average values determined after a relatively extensive reading of data from a number of different tracks across the radii of the discs 110.

At this point it will be noted that the absolute magnitude of the resulting adaptive VGA values, as well as the difference between the adaptive VGA values and the initial, baseline VGA values, serve to allow characterization of a particular head as constituting a long term reliability risk for the device 100, allowing replacement of the head prior to device shipment.

Preferably, the adaptive VGA value for each head 114 is determined as follows. A first head 114 is selected and positioned over a first track 120, and the head is used to read a selected number of data sectors from the track. The resulting VGA value from the first track, denoted herein as VGA(track1, head1), is temporarily stored.

This process is repeated for additional tracks until a total number n of resulting VGA values have been determined and temporarily stored. A first intermediate average VGA value, denoted herein as ADP_VGA_1, is then preferably calculated in accordance with the following relationship:

$$ADP\_VGA\_1 = \frac{\sum [VGA(trackn, head1)]}{n} \quad (1)$$

The process is preferably sequentially repeated N number of times for the first head, resulting in intermediate VGA values from ADP_VGA_1 to ADP_VGA_N for the first head. An advantage of successively obtaining multiple averaged VGA values in this manner is that degraded performance heads may tend to show reduced amplitude performance (and hence, generate higher VGA values to compensate) over an extended period of continuous operation.

A final adaptive VGA value for the first head, denoted FINAL_ADP_VGA, is thereafter preferably calculated by dropping the highest and lowest intermediate values (min and max) and taking an average of the rest, such as by the following relationship:

$$FINAL\_ADP\_VGA = \frac{\sum [ADP\_VGA\_N - \text{min value} - \text{max value}]}{N - 2} \quad (2)$$

This final adaptive VGA value is thereafter stored in a second register 166 (FIG. 2), and the foregoing process is repeated for each of the remaining heads.

Table 2 provides exemplary adaptive VGA values obtained for the heads of Table 1:

TABLE 2

| HEAD | BASELINE VGA VALUE | ADAPTIVE VGA VALUE |
| --- | --- | --- |
| 0 | 109 | 127 |
| 1 | 117 | 111 |
| 2 | 089 | 086 |
| 3 | 109 | 102 |
| 4 | 096 | 093 |
| 5 | 075 | 117 |
| 6 | 097 | 095 |
| 7 | 104 | 094 |

Preferably, at this point the absolute magnitudes of the adaptive VGA values are compared to a predetermined threshold value, T1. The T1 value is empirically determined and generally comprises an upper limit beyond which head performance is deemed to be excessively degraded.

For purposes of the present example, it is contemplated that empirical studies and analysis efforts resulted in selection of a T1 value of 120. Head 0, having an adaptive VGA value of 127, exceeds this threshold and hence would be characterized as exhibiting excessive degradation, and would be removed and replaced from the device 100 on this basis.

The next preferred step is to determine a delta, Δ (absolute magnitude difference) value for each head, as set forth by Table 3:

TABLE 3

| HEAD | BASELINE VGA VALUE | ADAPTIVE VGA VALUE | DELTA (Δ) |
| --- | --- | --- | --- |
| 0 | 109 | 127 | 18 |
| 1 | 117 | 111 | 06 |
| 2 | 089 | 086 | 03 |
| 3 | 109 | 102 | 07 |
| 4 | 096 | 093 | 03 |
| 5 | 075 | 117 | 42 |
| 6 | 097 | 095 | 02 |
| 7 | 104 | 094 | 10 |

The delta values are compared to a second predetermined threshold value, T2. As before, the T2 value is empirically determined and generally comprises an upper difference limit beyond which head performance is deemed to be excessively degraded.

For purposes of the present example, it is contemplated that empirical studies and analysis efforts resulted in selection of a T2 value of 30. Head 5, having a delta value of 42, exceeds this threshold and would be characterized as exhibiting excessive degradation. Thus, head 5 would be removed and replaced from the device 100 as posing an unacceptable long term reliability risk.

Figure 3:
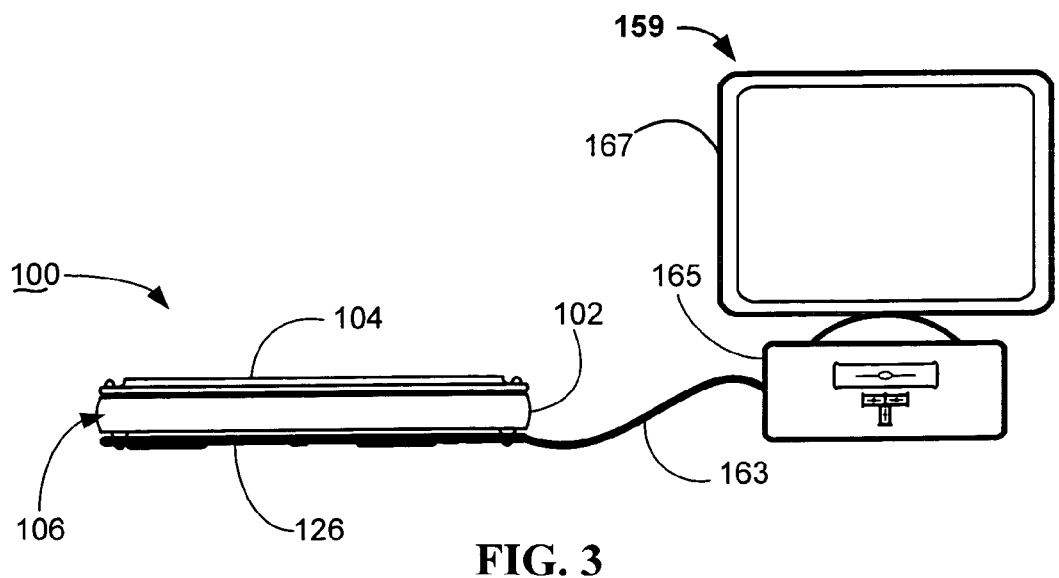
FIG. 3 is a disproportionately scaled, elevational view of a combination for characterizing levels of degradation of the heads of the device of FIG. 1.

FIG. 3 shows the data storage device 100 configured for communication with a monitoring device 159 (it will be noted that the data storage device 100 and the monitoring device 159 are not drawn to the same scale).

The monitoring device 159 includes an interface cable 163 secured between the data storage device 100 and a processing unit 165. The processing unit 165 includes interface electronics (not shown separately), which communicates across the interface cable 163 with the data storage device 100. The processing unit 165 also communicates with a display module 167 that is used to display the results from the execution of head degradation characterization code in accordance with the flow chart of FIG. 4.

Figure 4:
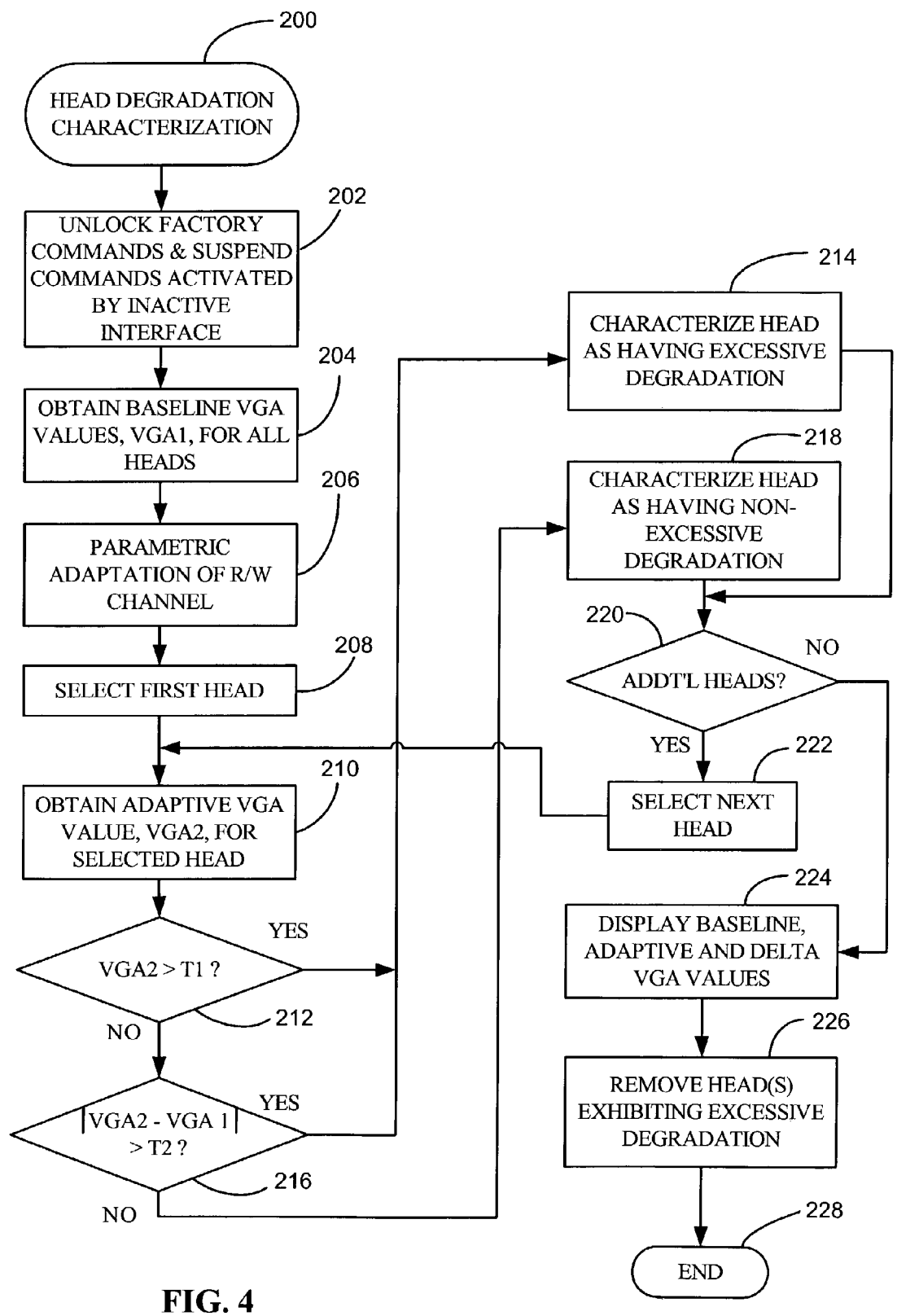
FIG. 4 is a flow chart generally representative of steps carried out in accordance with preferred embodiments to characterize the heads of the device of FIG. 1.

FIG. 4 shows a HEAD DEGRADATION CHARACTERIZATION routine 200, representative of the head degradation characterization code used to characterize a level of degradation of the heads 114 of the device 100. It will be understood that the routine 200 is preferably carried out during device manufacturing, and is executed after the device 100 has been placed into an operational ready condition (i.e., the device electronics have been initialized, the discs 110 have been accelerated to a rotational velocity sufficient to aerodynamically support the heads 114, the heads have been moved out over the associated disc surfaces 111, etc.).

At step 202, factory commands are unlocked (activated), while functions of the device control code utilized during periods of idle time of the interface hardware 148 are suspended (i.e., commands that are activated when the interface or bus are idle are set to inactive). This prepares the device 100 for ensuring steps in the routine to be performed without interruption by active mode or idle mode commands.

At step 204, the head degradation characterization code instructs the controller to acquire a baseline VGA value (denoted as "VGA1" in FIG. 4) for each of the heads 114 in turn, in a manner as discussed above. The baseline VGA1 values for the heads are stored in the buffer 138 by the conclusion of this step.

Preferably, conventional certification and test routines are next carried out during step 206 to certify and establish proper parametric adaptation of various circuits of the device 100, including the R/W channel 150. Such parametric adaptation of the R/W channel 150 will depend upon the configuration of the channel, but will generally include operations such as setting adaptive filtering parameters in a low pass filter, selection of appropriate tap weights for a finite impulse response (FIR) filter, optimization of various Viterbi detector sampling threshold parameters, etc. It will be contemplated that at the conclusion of step 208, the R/W channel 150 has configured to provide optimum error rate performance (i.e., to adaptively reduce read back errors to a sufficiently low level).

A first head 114 is selected at step 208, and at step 210 a final adaptive VGA value (denoted as "VGA2") is determined for the selected head in a manner as discussed above. This value is stored in the second register 166.

At decision step 212, the adaptive VGA value VGA2 is compared to the T1 threshold. When VGA2 exceeds the T1 threshold, the head is characterized as having excessive degradation, as shown by step 214.

Contrawise, when VGA2 does not exceed T1, the flow continues to decision step 216 where the absolute magnitude of the difference between the VGA1 and VGA2 values is compared to the T2 threshold.

When the T2 threshold is exceeded, the head is characterized as having excessive degradation (step 214), otherwise the head is characterized as exhibiting non-excessive degradation (i.e., a "good" head), as shown by step 218.

The routine determines at decision step 220 whether additional heads remain to be evaluated, and if so, the process selects the next head at step 222 and returns as described above for each additional head in turn. Once all the heads have been evaluated, the routine continues to step 224 where the baseline, adaptive and delta VGA values are displayed on the display module 167.

Any heads 114 exhibiting excessive degradation are thereafter removed and replaced, as shown by step 226, and the routine ends at step 228.

Accordingly, embodiments of the present invention are generally directed to a method and apparatus for characterizing a data transducing head (such as 114) of a data storage device (such as 100) as exhibiting either excessive or non-excessive degradation.

The method preferably includes determining a baseline variable gain amplifier (VGA) gain control value for the head (such as by step 204), the baseline VGA gain control value operatively normalizing an amplitude of a readback signal from the head to a selected range suitable for decoding by read channel circuitry. The read channel circuitry is next parametrically adapted to optimize read error performance (such as by step 206), and an adaptive VGA gain control value for the head is obtained (such as by step 208).

The head is thereafter characterized as exhibiting excessive degradation when the adaptive VGA gain control value exceeds a predetermined VGA value threshold (such as by steps 212, 214), else when a difference between the adaptive VGA gain control value and the baseline VGA gain control value exceeds a predetermined delta VGA value threshold (such as by steps 216, 214).

Preferably, the head is removed and replaced with a second head when the original head is found to exhibit excessive degradation (such as by step 226). Contrawise, the head is adjudged as a good head (i.e., exhibiting non-degradation) when the magnitude of the VGA gain control value, and the difference, do not exceed the respective thresholds. The method is preferably carried out in a manufacturing environment prior to shipment of the device to a customer.

The apparatus preferably comprises a data storage device (such as 100) having a data transducing head (such as 114) adjacent a recording medium (such as 110. Read channel circuitry (such as 150) is coupled to the head and comprises a variable gain amplifier (VGA, such as 160) and a gain control block (such as 162). The gain control block operably supplies VGA gain control values to the VGA to nominally maintain amplitudes of readback signals obtained from the head within a selected range suitable for remaining portions of the read channel circuitry.

A controller (such as 136) coupled to the read channel circuitry operates to determine a baseline VGA gain control value, perform a parametric adaptation of the read channel circuitry, and then obtain an adaptive VGA gain control value. The controller further operates to characterize the head as exhibiting excessive degradation in relation to a magnitude of the adaptive VGA gain control value and in relation to a difference between the adaptive VGA gain control value and the baseline VGA gain control value.

Preferably, the device operates in conjunction with a monitoring system (such as 159) and the results of the characterization operation are displayed on a monitor (such as 167).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising:

parametrically adapting read channel circuitry; and identifying degradation of a transducer coupled to the read channel circuitry by characterizing the transducer with respect to degradation in relation to determining an effect that a parametric adaptation of the read channel circuitry has on a gain control value of the transducer wherein the identifying degradation step comprises characterizing the transducer as exhibiting excessive degradation when a magnitude of a second gain control value determined after the parametric adaptation exceeds a first predetermined threshold, else characterizing the transducer as exhibiting excessive degradation when a difference between a first gain control value determined before the parametric adaptation and the second gain control values exceeds a second predetermined threshold.

2. The method of claim 1, wherein the parametrically adapting read channel circuitry step comprises adjusting at least one parameter of the read channel circuitry to reduce a read error rate.

3. The method of claim 1, it wherein the first gain control value comprises a baseline variable gain amplifier (VGA) value which operationally normalizes an amplitude of a readback signal from the transducer to a selected range suitable for decoding by the read channel circuitry prior to the parametrically adapting step.

4. The method of claim 3, wherein the second gain control value comprises an adaptive VGA value which operationally normalizes the amplitude of a readback signal from the transducer to a selected range suitable for decoding by the read channel circuitry after the parametrically adapting read channel circuitry step.

5. The method of claim 1, wherein the first gain control value of the identifying degradation step is determined by providing an initial gain control value to a variable gain amplifier (VGA) coupled to the transducer, reading prewritten patterns from a medium to provide a series of readback signals, and using peak-to-peak amplitudes of the series of readback signals to converge the initial gain control value to a baseline gain control value.

6. The method of claim 5, wherein the prewritten patterns are written to guard tracks not used by a customer to store user data.

7. An apparatus, comprising:

read channel circuitry coupled to a transducer; and a controller configured to parametrically adapt the read channel circuitry and characterize the transducer wit respect to degradation in relation to determining an effect that the parametric adaptation has on a gain control value of the transducer, wherein the controller is configured to characterize the transducer as exhibiting excessive degradation when a magnitude of a second gain control value determined after the parametric adaptation exceeds a first predetermined threshold, else characterize the transducer as exhibiting excessive degradation when a difference between a first gain control value determined before the parametric adaptation and the second gain control value exceeds a second predetermine threshold.

8. The apparatus of claim 7, wherein the read channel circuitry comprises a variable gain amplifier (VGA) which applies a variable gain in relation to the respective first and second gain control signals.

9. The appartus of claim 7, wherein the controller parametrically adapts the read channel circuitry by adjusting at least one parameter of the read channel circuitry to reduce a read error rate.

* * * * *